(12) United States Patent
Hare et al.

(10) Patent No.: US 8,189,461 B2
(45) Date of Patent: *May 29, 2012

(54) CLUSTER BRING-UP IN A DISTRIBUTED TOPOLOGY LIVENESS SYSTEM

(75) Inventors: John R. Hare, Highland, NY (US); Felipe Knop, Poughkeepsie, NY (US)

(73) Assignee: International Business Machines Corporation, Armonk, NY (US)

(\*) Notice: Subject to any disclaimer, the term of this patent is extended or adjusted under 35 U.S.C. 154(b) by 337 days.

This patent is subject to a terminal disclaimer.

(21) Appl. No.: 12/354,890

(22) Filed: Jan. 16, 2009

(65) Prior Publication Data

US 2009/0129397 A1 May 21, 2009

Related U.S. Application Data

(63) Continuation of application No. 11/290,032, filed on Nov. 30, 2005, now Pat. No. 7,480,281.

(51) Int. Cl.
*G01R 31/08* (2006.01)
*H04W 4/00* (2009.01)

(52) U.S. Cl. .......................... 370/229; 370/254; 370/338

(58) Field of Classification Search .................. 455/445, 455/571, 522; 709/227; 370/254, 229, 338, 370/235, 256, 255, 348, 336, 216, 408; 342/465
See application file for complete search history.

(56) References Cited

U.S. PATENT DOCUMENTS

| | | | |
|---|---|---|---|
| 5,943,014 A * | 8/1999 | Gilhousen | 342/465 |
| 6,026,073 A | 2/2000 | Brown et al. | |
| 6,606,362 B1 | 8/2003 | Dalzell et al. | |
| 6,941,350 B1 | 9/2005 | Frazier et al. | |
| 2003/0005086 A1 | 1/2003 | Pouchak et al. | |
| 2004/0071147 A1 | 4/2004 | Roadknight et al. | |
| 2004/0146064 A1 | 7/2004 | Kramer | |
| 2004/0205148 A1 | 10/2004 | Bae et al. | |
| 2005/0054346 A1 | 3/2005 | Windham et al. | |
| 2005/0071473 A1 | 3/2005 | Rosenstock et al. | |
| 2006/0268742 A1* | 11/2006 | Chu et al. | 370/254 |
| 2007/0291772 A1 | 12/2007 | Andersson et al. | |

OTHER PUBLICATIONS

Office Action for U.S. Appl. No. 11/290,032 (U.S. Patent No. 7,480,281) date Apr. 16, 2008.

\* cited by examiner

*Primary Examiner* — Kiet Doan
(74) *Attorney, Agent, or Firm* — Matthew W. Baca; Heslin Rothenberg Farley & Mesiti P.C.

(57) ABSTRACT

A method is provided for establishing clusters in a distributed data processing environment having a plurality of nodes. The frequency of messages sent for the purpose of cluster formation is selected based on ranking of the nodes. Higher ranking nodes transmit such messages more frequently than lower ranking nodes. Lower ranked nodes thus are provided with an opportunity to join a cluster without first having to transmit their own messages to effectuate the joining.

18 Claims, 3 Drawing Sheets

CLUSTER BRING-UP IN A DISTRIBUTED TOPOLOGY LIVENESS SYSTEM

CROSS-REFERENCE TO RELATED APPLICATIONS

This application is a continuation of U.S. patent application Ser. No. 11/290,032, filed Nov. 30, 2005, now U.S. Pat. No. 7,480,281, issued Jan. 20, 2009, entitled "Method for Improving Cluster Bring-Up in a Distributed Topology Liveness System," by Hare et al., the entirety of which is hereby incorporated herein by reference.

TECHNICAL FIELD

The present invention is generally directed to distributed computer networks, and more particularly, to methods for bringing up a cluster of nodes within the networks without unnecessarily clogging the system with communications traffic regarding the liveness and connectivity status of a large plurality of data processing nodes.

BACKGROUND OF THE INVENTION

In a distributed system, during an initialization phase a node may not have knowledge of what other nodes may exist and be in operation. Nodes may find each other by exchanging discovery messages and then eventually reach the state where all the nodes that are "up" know about each other. On a system with a large number of nodes, however, this message exchange may introduce significant message traffic into the network, which may result in a slow discovery process. While the problem posed is relatively easily solves when there are only a few nodes, when there are a large number of nodes (say 1,000 solely for the sake of example, the lack of information about the status of the other nodes in the distributed network leads to the exchange of numerous messages which can stall message traffic within the system. Moreover the problem grows exponentially with the number, N, of nodes. The presently proposed method of solving this problem focuses on reducing the amount of message traffic and also on providing a more orderly bring-up (discovery) process.

Others have approached similar problems but none include the elements of the present invention. For example, U.S. Pat. No. 6,026,073 discusses node ranking but only for the purpose of determining a "restoration route." There is no mention of the use of ranking to control message frequency.

Published U.S. Patent Application 2003/0005086 A1 also appears to employ the notion of node ranking but it has no method to deal with contention and no multiple "supervisors." The use of ranking is for entirely different purposes.

U.S. Pat. No. 6,606,362 also mentions the concept of ranking but only assigns ranks to signal sources so as to allow the signal recipient to select from among several sources.

Published U.S. Patent Application 2004/0146064 A1 uses random delays in the response to reduce the amount of message contention. This is contrary to the teaching of the use of ranking.

Published U.S. Patent Application 2004/0205148 A1 does not employ the concept of ranking and is not directed to the problem of bringing up nodes to go into a cluster. Furthermore, it assumes the pre-existence of a cluster and is rather directed to the problems associated with node failure.

Published U.S. Patent Application 2005/0054346 A1 is essentially unrelated and is connected only by the concept of prioritizing messages according to type-of-service and the routes are prioritized according to quality-of-service.

Published U.S. Patent Application 2005/0071473 A1 appears to describe a method for selecting a limited number of standby subnet messages based on a priority value and possibly a global identifier as a tie-breaker.

U.S. Pat. No. 6,941,350 appears to describe a method for selecting a master network manager during initialization but does not employ node ranking to control message congestion but rather assigns priorities to subnets.

U.S. Pat. No. 6,941,350 entitled "Method and Apparatus for Reliably Choosing a Master Network Manager During Initialization of a Network Computing System," Frazier, et al., issued Sep. 6, 2005, which is hereby incorporated herein by reference in its entirety, appears to describe a scheme in which nodes are ranked based on priority and the exchange of messages to find out whether a given node should be the network manager. There is no mention of altering frequency according to any priority or ranking.

SUMMARY OF THE INVENTION

In accordance with the present invention, there is provided a method for reducing formation messages in establishing clusters in a distributed data processing environment having a plurality of nodes. In its broadest embodiment, the method comprises ranking nodes within the environment according to at least one criterion, sending messages requesting cluster formation from a first node to a plurality of other nodes in the environment. The frequency of transmitting these (cluster forming) messages is chosen based on a node ranking for the first node in which higher ranking nodes transmit these messages more frequently than lower ranking nodes, the first node being a higher ranking node relative to the plurality of other nodes, and in which lower ranked nodes in the environment are thus provided with an opportunity to join a cluster without having to themselves act as a requestor for joining a cluster. The present invention also preferably employs a function which controls the period between such messages in such a way that nodes that have a higher ranking have a greater frequency (or equivalently, a lesser period). In the present invention the function that determines the chosen rank is a monotonic function whose argument is the (IP) address assigned to the node. This function is also provided with several parameters which are employable foe fine tuning purposes.

In one particular embodiment of the present invention the method referred to above is made to be dynamically adjustable. In particular, a mechanism is provided in which a node that receives a "PROCLAIM" (that is, an initial cluster forming "invitation") message from a node with lower IP address (hence a lower tank) reduces the interval between PROCLAIM messages by multiplying it by a given factor P ($0<P<1$).

In another embodiment of the present invention, in the main method described above, a mechanism is provided in which a node getting a PROCLAIM message does not immediately respond with a message, but—for a predetermined time interval—waits for a PROCLAIM message from a node with an even higher IP address. At the end of this time period, the node responds to the node with the highest IP address. Thus, responses and the corresponding flow of network traffic are reduced by eliminating responses to lower ranked nodes.

Accordingly, there is provided a method for cluster bring-up in a distributed system where nodes are quickly able to locate all their peers with a reduced number of messages sent on the network. During initialization, each node starts with no knowledge of whether the other peer nodes are up. The goal of the bring-up procedure is to allow each node to know of all the others that are up.

The method involves ranking all the nodes, where the node with the highest ranking (highest ranking IP address in the presently preferred implementation) becomes the "Group Leader." Messages are sent across the network to advertise the existence of nodes that are candidates for becoming being Group Leaders. The frequency of sending these messages is related to the ranking value of the sender. The control of the frequency of message transmission reduces the load on the network and provides for a more orderly and quicker bring-up.

Accordingly, it is an object of the present invention to reduce the flow of message traffic during system bring up in a multinode data processing network.

It is a further object of the present invention to bring up multinode distributed processing systems in a faster and more reliable manner.

It is also an object of the present invention to dynamically adjust message transmission frequency.

It is yet another object of the present invention to cause a more rapid transition to a stable state for all nodes during system bring up in a multinode data processing network.

It is also an object of the present invention to avoid the sending of unnecessary messages.

It is also an object of the present invention to avoid the need for transmitting a message to a node which is unlikely to be of use to that node in the process of cluster formation.

It is a still further object of the present invention to facilitate the formation of clusters with a data processing network.

Lastly, but not limited hereto, it is an object of the present invention to promote the utilization of large scale data processing networks.

The recitation herein of a list of desirable objects which are met by various embodiments of the present invention is not meant to imply or suggest that any or all of these objects are present as essential features, either individually or collectively, in the most general embodiment of the present invention or in any of its more specific embodiments.

BRIEF DESCRIPTION OF THE DRAWINGS

The subject matter which is regarded as the invention is particularly pointed out and distinctly claimed in the concluding portion of the specification. The invention, however, both as to organization and method of practice, together with the further objects and advantages thereof, may best be understood by reference to the following description taken in connection with the accompanying drawings in which:

BEST MODE FOR CARRYING OUT THE INVENTION

Figure 1:
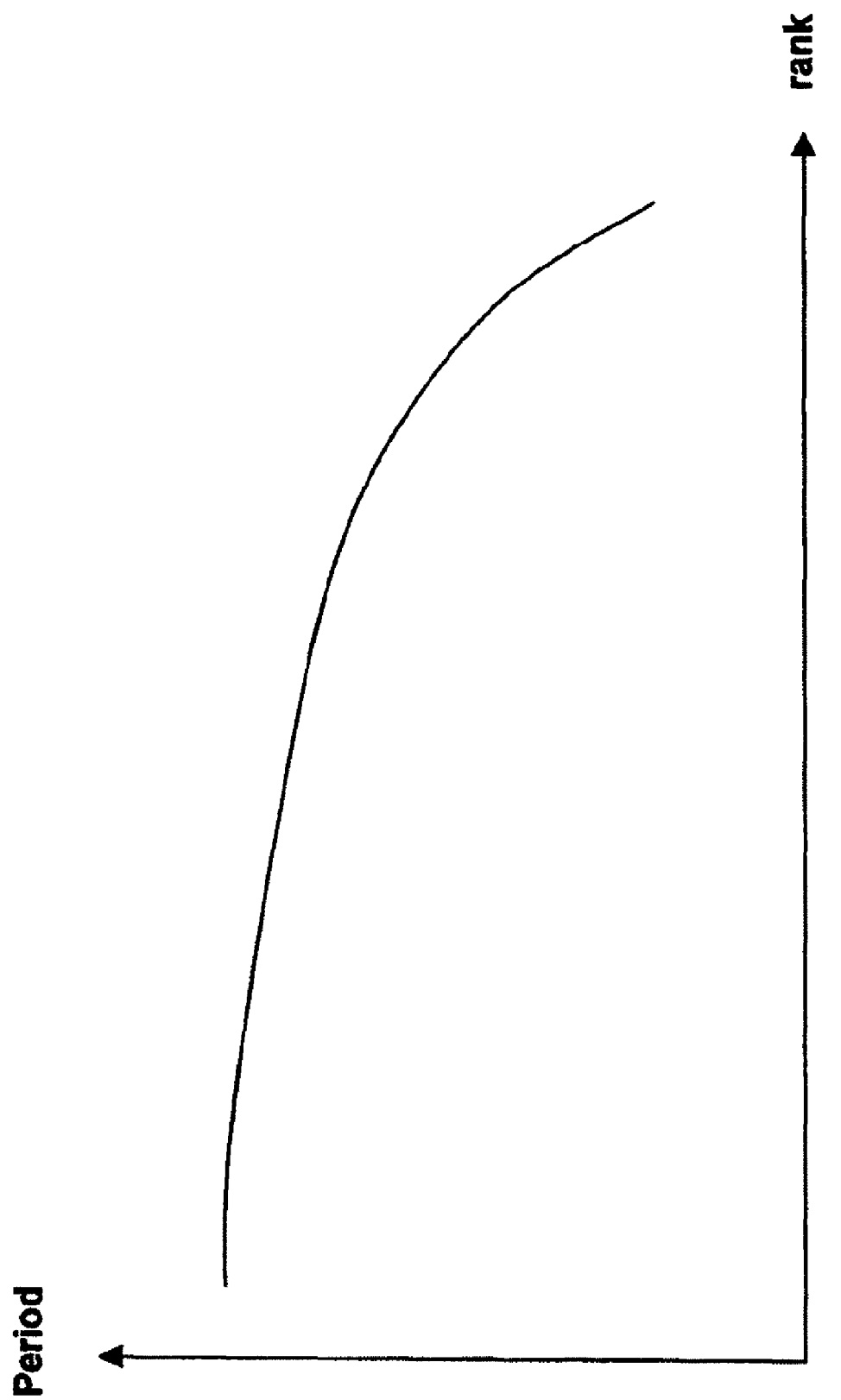
FIG. 1 is a graph of message transmittal period versus node rank which provides an approximate illustration of the nature of the desired variation between the these two variables.

Although the method is implemented as part of the RSCT (Reliable Scalable Cluster Technology) Topology Services, it may have applications in other distributed subsystems systems as well.

Adapter and node liveness determination lies at the heart any highly available distributed cluster system. In order provide high availability services, a cluster system must be able to determine which nodes, networks, and network adapters in the system are working. The failure in any such component must be detected and communicated to higher level software subsystems, and if possible cluster software and applications must recover from the failure by moving critical resources into other components.

Determination of node, network, and network adapter liveness is often made through the use of daemon processes running in each node of the distributed system. Daemons run distributed protocols and exchange liveness messages that are forced through the different network paths in the system. If no such liveness messages are received within a predetermined interval then the sending node or network adapter is assumed to be not working ("dead") by the others.

Heartbeat Protocols

To explain the mechanism, and how it is employed in Topology Services, the adapter membership ("heartbeating") protocols in the subsystem are explained in some detail. In order to monitor the health and connectivity of the adapters in each network, all adapters in the network must attempt to form an "Adapter Membership Group" (AMG), which is a group containing all network adapters that can communicate with each other in the network. Adapters in an AMG monitor the "liveness" of each other. When an AMG is formed, all group members receive an "AMG ID" which identifies the AMG. Adapters that fail are expelled from the group, and new adapters that are powered up are invited to join the group. In both cases, a new AMG with a new AMG ID is formed. Each AMG has one member that is the Group Leader (GL), and all members know who the GL is. Note that a given node, which may have multiple network adapters, may belong to several AMGs, one for each of its network adapters.

Each AMG has an ID, which is included in all protocol messages. The group ID is composed by the GL identification (chosen—to be its IP (Internet Protocol) address) and an instance number (chosen to be the timestamp of when the AMG was formed). Each member of an AMG also has an ID, which composed by the member identification (chosen to be its IP address) and an instance number (chosen to be the timestamp of when daemon was started or when the adapter was re-initialized). For the purposes of the present invention the IP address is a given input. It is a parameter that is previously determined by the system administrator. There are no requirements on this address that are imposed by the present invention. However, it should be unique.

To determine the set of adapters that are alive in each network an adapter membership protocol is run in each of the networks. Messages in this protocol are sent using UDP/IP. Adapters that are alive form an AMG, where members are organized in a virtual ring topology. To ensure that all group members are alive, each member periodically sends "HEART BEAT" messages to its "downstream neighbor" and monitors "HEART BEAT" messages from its "upstream neighbor." Protocols are run when adapters fail or when new adapters become functional. The goal of such protocols is to guarantee that the membership group contains at each moment all (and only) the adapters in the network (but only those belonging to the cluster) that can communicate with each other.

Besides the GL, each group preferably has a "Crown Prince" (backup group leader node). The group leader is responsible for coordinating the group protocols, and the crown prince is responsible for taking over the group leadership when the group leader adapter fails. Both the choice of group leader and crown prince, and the position of the adapters in the ring, are determined by a predefined adapter priority/ranking rule, which is preferably chosen to be the adapters" IP addresses. A list of all possible adapters in each network is contained in a configuration file that is read by all the nodes at startup and at reconfiguration time.

Join Protocol

In order to attract new members to the group, the Group Leader (GL) in each group periodically sends "PROCLAIM" messages to adapters that are in the adapter configuration but do not currently belong to the group. The message is only sent to adapters having a lower IP address (lower ranking, that is higher "ranking value") than that of the sender.

To provide for better efficiency when a large number of nodes are part of the cluster, the "PROCLAIM" message may be sent via broadcast, which obviates the need of the GL to send the message to each individual node. A side-effect of using broadcast is that it is possible for the message to reach nodes with higher IP address than the sender. Such "PROCLAIM" messages coming from nodes with lower IP address (lower ranking) are preferably ignored.

The "PROCLAIM" messages are ignored by all adapters that are not group leaders. A GL node receiving a "PROCLAIM" message from a higher priority (higher IP address) node responds with a "JOIN" message on behalf of its group. The message contains the membership list of the "joining group." Thus "PROCLAIM" messages are typically only accepted from nodes of higher rank. Such messages from lower ranked nodes are preferably ignored.

A node GL1 receiving a "JOIN" message from GL2 will attempt to form a new group containing the previous members plus all members in the joining group. GL1 then sends a "PTC" ("Prepare To Commit") message to all members of the new group, including GL2.

Nodes receiving a "PTC" message reply with a "PTC_ACK" message. All nodes from which a "PTC_ACK" message was received are included in the new group. The group leader (GL1) sends a "COMMIT" message, which contains the entire group membership list, to all new group members.

Receiving a "COMMIT" message marks the transition to the new group, which now contains the old members plus the joining members. After receiving this message, a group member starts sending "HEART BEAT" messages to its (possibly new) downstream neighbor, and starts monitoring "HEART BEAT" messages from its (possibly new) upstream neighbor. Both "PTC" and "COMMIT" messages require an acknowledgment to ensure they were received. If no acknowledgment is received, then a finite number of retries is made. Failure to respond to a "PTC" message—after all retries have been exhausted—results in the corresponding adapter not being included in the new group. If a daemon fails to receive a "COMMIT" message after all retries of the "PTC_ACK" message, then the local adapter gives up the formation of the new group, and re-initializes itself into a singleton group. This phenomenon should only occur in the relatively rare case where the GL fails in the short window between sending the "PTC" and "COMMIT" messages.

When the Topology Services daemon is initialized, it forms a singleton adapter group (of which the node is the GL) in each of its adapters. The node then starts sending and receiving "PROCLAIM" messages.

Death Protocol

A node or adapter will monitor "HEART BEAT" messages coming from its "upstream neighbor" (the adapter in the group that has the next highest IP address among the group members). When no "HEART BEAT" messages are received for some predefined period of time, the "upstream neighbor" is assumed to have failed. A "DEATH" message is then sent to the group leader, requesting that a new group be formed.

Upon receiving a "DEATH" message, the group leader attempts to form a new group containing all adapters in the current group except the adapter that was detected as failed. The group leader sends a "PTC" message to all members of the new group. The protocol then follows the same sequence as that described above for the Join protocol.

After sending a "DEATH" message, a non-GL daemon expects to receive a "PTC" message shortly (while a GL node sends the "DEATH" message to itself). A number of retries is attempted, but if no "PTC" message is received then the interpretation is that the GL adapter (or its hosting node) died and the "crown prince" adapter also died, and therefore was unable to take over the group leadership. In this case the adapter re-initializes itself into a singleton group and also sends a "DISSOLVE" message, inviting all group members to do the same. This is the mechanism that allows all members of the group to find about the simultaneous demise of the GL and crown prince members.

Node Reachability

A node reachability protocol is used to allow computation of the set of nodes that are reachable from the local node (and therefore considered alive). Since not all nodes may be connected to the same network, some nodes may be reachable only through a sequence of multiple network hops. Node reachability can only be computed when information about all networks, even those that do not span all nodes is taken into account.

To compute node reachability, an eventual agreement protocol is used: reachability information at each network is propagated to all networks when the network topology stops changing, eventually all nodes will have consistent information about all networks. Each node is then able to compute the set of reachable nodes independently and is able to arrive at a consistent result.

Periodically, and until some stopping criteria instruct the daemon to stop doing so, the nodes send the following messages:

(a) a "Node Connectivity Message" (NCM) is sent from all group members to the GL (Group Leader). An NCM for a given network contains the AMG ID for that network plus all of the "disabled AMG Ids" for the local adapters that are disabled. A node sends NCMs to each GL of the groups to which the local adapters belong.

The GL stores all the information coming from the NCMs in a "Node Connectivity Table" (NCT). The NCT stores the (local view of the) global network topology, and contains the AMG ID for each node and network adapter in the system. Any two nodes that have the same AMG ID are assumed to be connected to each other by the same network.

(b) a "Group Connectivity Message" (GCM) is sent from each GL to all group members. The GCM contains the AMG ID and the list of nodes that belong to the AMG. Also, for each of these nodes, a list of all "disabled AMG Ids" (in the other networks) is included. The information needed to send the GCM is extracted from the GL's NCT.

A node that receives a GCM updates its own NCT with the information in the message. If a daemon receiving a GCM determines that there are some groups to which the local adapters belong, whose members will not have received that GCM, the daemon forwards the GCM to these groups. The goal is to propagate the GCM to all the nodes in the system, even those that are not directly connected to the network that originated the GCM. Notice that the information sent in an NCM and GCM is a subset of the sender's NCT.

Stable/Unstable AMGs

To prevent "panic" actions of the protocol—such as those caused by the absence of a "COMMIT" message after all "PTC ACKs" (Prepare To Commit Acknowledgements) or by the simultaneous failure of the GL and Crown Prince—from causing major node reachability ripples, the concept of "stable" and "unstable" AMGs is employed in the present invention. Stable AMGs are those where some sort of steady state has been achieved, while unstable AMGs are those where membership changes are still likely to occur.

At initialization, a singleton AMG starts in the unstable state, since it is expected that the adapter will join other peers in bigger groups. The change into a stable group occurs after an inactivity period where membership changes stop occurring. Once a group is stable, it remains stable until the adapter is forced to re-initialize itself (such as because of a "panic" action).

AMG stability is tied to the NCT and to the sending of the NCM and GCM: to prevent unnecessary node reachability ripples, no information about unstable groups is sent in NCMs and GCMs. This effectively removes unstable groups from the computation of node reachability, and has the desirable effect of eliminating the knowledge of some temporary membership changes from the software layers above.

Improved Method for Sending PROCLAIM Messages

When all the nodes are started up at approximately the same time, the older method, wherein each node sends "PROCLAIM" messages periodically, may result in significant network traffic and an increase in CPU (Central Processing Unit) load. In addition, AMG formation tends to be chaotic, since a node may respond to a "PROCLAIM" message from a peer, which itself may receive a "PROCLAIM" message from a node with a higher IP (Internet Protocol) address, and so on. A number of small groups may form, before they finally coalesce into larger groups. Eventually, a single AMG is formed including all the members of the cluster. The time that it takes to form a single AMG may be sub-optimal though, because of:
 (a) the network load caused by the large number of "PROCLAIM" messages;
 (b) the CPU load imposed by the multiple "PROCLAIM" messages;
 (c) the overhead created by nodes forming smaller AMGs, only to have their AMGs "absorbed" by a node with a higher IP address; and
 (d) situations where a node responds to a "PROCLAIM" message with a "JOIN" message, but then the latter being rejected because the GL itself responded to a "PROCLAIM" from a node with a message with a higher IP address.

To address the issues above, a method is introduced where all nodes are ranked according to their IP address. The node with the highest IP address is assigned ranking 1 ("highest ranking"), while the node with the lowest IP address of N nodes ("lowest ranking") is assigned ranking N. A "ranking fraction" is defined where the highest IP address has value 1/N, and the lowest IP address has value 1. The higher-ranking nodes (lower ranking value) send the "PROCLAIM" message more frequently, and the reverse is the case for the lower-ranking nodes. In addition, higher-ranking nodes, up to a threshold (defined by a given "ranking fraction"), are allowed to start sending "PROCLAIM" messages as soon as they are initialized, while the remaining must wait for a "PROCLAIM" cycle.

For example, the following formula can be used to compute the interval used between sending "PROCLAIM" messages:

$$K(F+(1-F)R^{(1/X)}),$$

where:
 K is a constant—higher values result in less frequent "PROCLAIM" messages, and therefore less network traffic at a cost of slower cluster formation;
 F is a fraction that controls how fast the higher-ranking nodes should send "PROCLAIM" messages. Lower values yield a faster rate, which results in faster cluster formation but higher network traffic;
 R is the "ranking fraction" defined above; and
 X is a factor that can be used in more drastically increasing the interval between "PROCLAIM" messages as the ranking fraction value increases. Higher values of X amplifies this effect. A value for X of 1 gives a linear variation of period with the ranking.

It is noted that the function provided in the equation above, while being both useful and preferred, is not required to take the form shown. Any function which is monotonic works equally as well. In preferred embodiments of the present invention say a useful value for K is about 10 secs, a useful value for F is about is 0.1 and a useful value for X is about 2. As explained elsewhere herein, R is not a constant.

With the mechanism described above, lower-ranking nodes have an initial delay in sending the "PROCLAIM" message, and then should send the message more infrequently (compared to a scheme where all the nodes send the message with the same frequency). Very likely a lower-ranking node will end up receiving a "PROCLAIM" message before it sends any, which fulfills the goal of achieving less network traffic and more orderly cluster bring-up.

The relation between the period of time between message transmission for a given node and the rank assigned to the node is illustrated in FIG. 1. Note that this period of time is the inverse of the transmission frequency. Shown in FIG. 1 is a graph of message transmittal period versus node rank. This illustration is approximate and is provided solely for purposes of illustration. However, the graph well illustrates the notion that nodes having a higher rank, as assigned by the function provided above, will tend to have a lower period (higher frequency) of message transmission during cluster formation. Conversely, nodes having a lower rank will tend to have a higher period (lower frequency) of message transmission.

Figure 2:
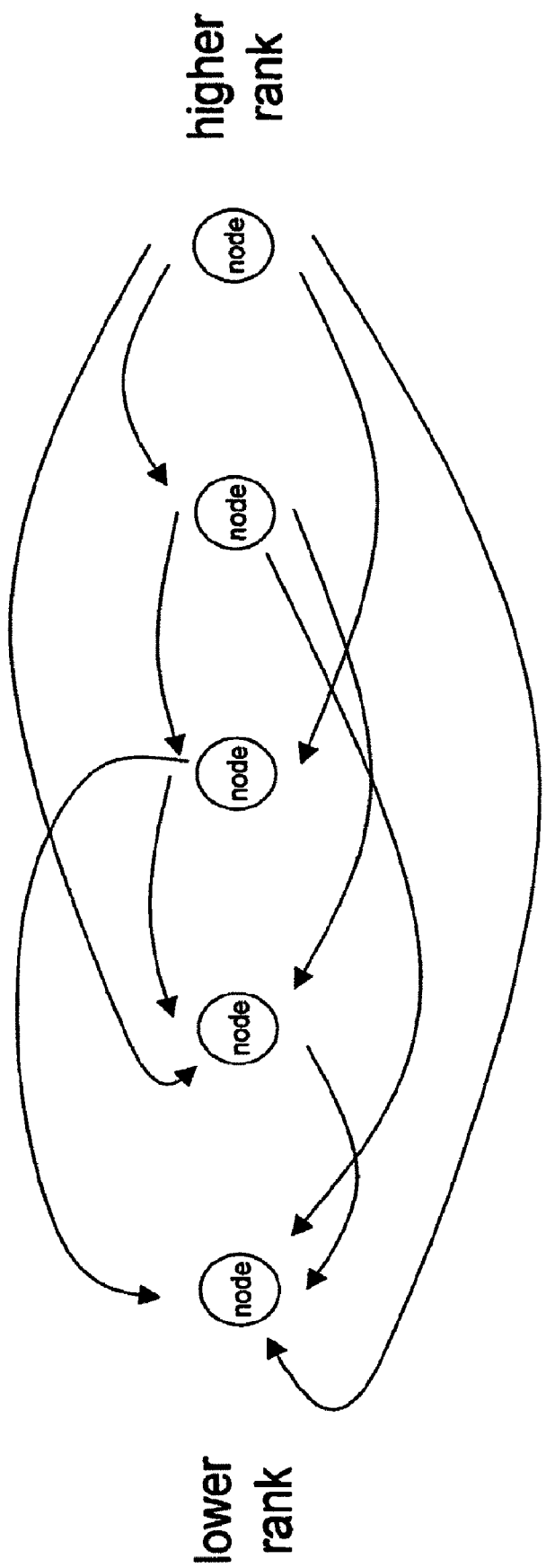
FIG. 2 is a block diagram illustrating for one snapshot in time the flurry of (cluster formation) messages that are unleashed at network startup in the absence of the present invention.
Figure 3:
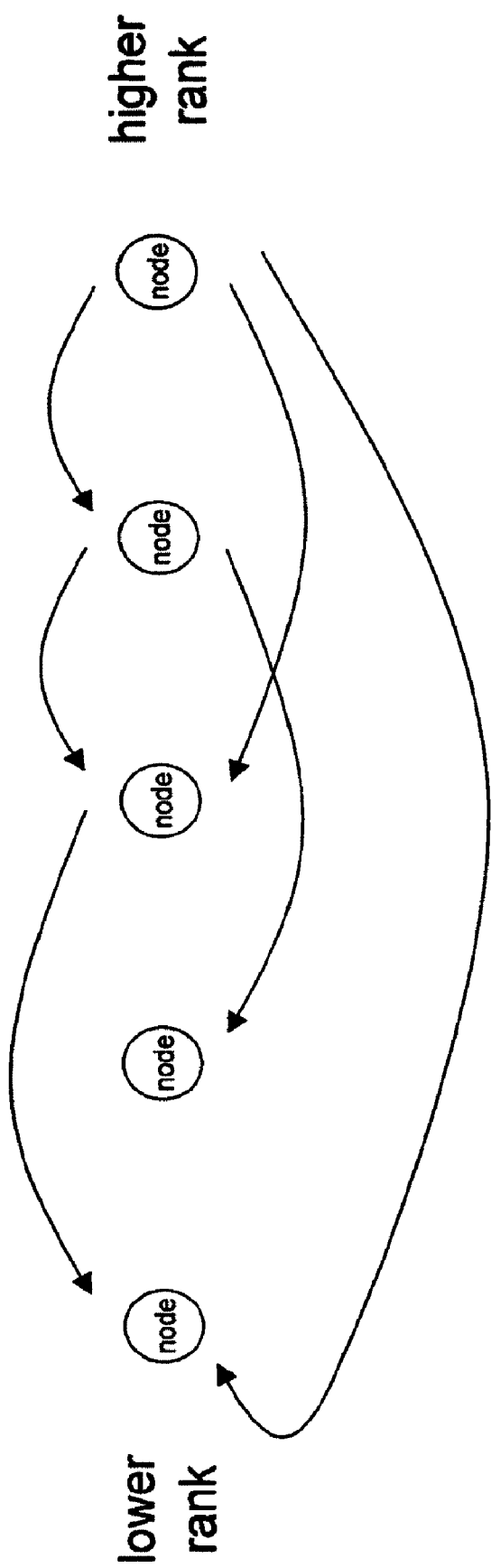
FIG. 3 is a block diagram illustrating for one snapshot in time the improvement in the number of (cluster formation) messages being transmitted.

FIG. 2 illustrates the potential cacophony of message transmissions that can occur during system bring up operations without the use of the present invention. In particular, one will note the fact that lower ranked nodes are as equally likely as higher ranked nodes to engage in the initiation of attempts at cluster formation. It is to be noted here, and for FIG. 3 as well, that for illustrative purposes only a small number of nodes is shown. In practice, the present invention is most useful when the number of nodes is large. The more the number of nodes, the more useful the invention becomes. For purposes of understanding, the reader should imagine the nest of links engendered by a situation in which there are a thousand nodes. With specific reference to FIG. 3, should be noted that message transmittal primarily occurs from the higher ranked nodes.

Note that an approach where only the node with the highest IP address sends "PROCLAIM" messages, though simple and optimal in terms of network traffic, becomes impractical, since that node may not be operating, and that would result in the rest of the cluster being unable to form a single AMG. The method of the present invention produces an "end result" is a single group with all the nodes, and that group has a single group leader (GL).

Using Received PROCLAIM Messages as Feedback Information

"PROCLAIM" messages received by a node "A" from lower IP addresses (which should only happen if they are broadcast) are a sign that nodes with lower IP address are being initialized, and that they somehow did not get "PROCLAIM" messages either from node "A," node A's GL, or from another node with a higher IP address than node "A". Assuming that node "A" is a GL, it can respond to the message with an immediate "PROCLAIM" message of its own, but this could create significant network traffic, especially if (1) several nodes with low IP address happen to also send a "PROCLAIM" message and (2) several nodes happen to receive that "PROCLAIM" message.

A mechanism is introduced herein where a node receiving a "PROCLAIM" message from a node with lower IP address reduces its interval between "PROCLAIM" messages by multiplying it by a given factor P (0<P<1). This results in the next "PROCLAIM" message being sent quicker (and thus targeting the nodes with lower IP address that originated the "PROCLAIMs"), while still allowing for some batching in case subsequent "PROCLAIM" messages are received from nodes with lower IP addresses. When the "PROCLAIM" message is finally sent, the interval is reset to the "original" value.

This mechanism results in an even faster cluster "PROCLAIMs" to reach their targets sooner.

PROCLAIM "Auction"

Since several nodes are typically initialized at approximately same time, a large number of "PROCLAIM" messages may flow through the network. It may happen that a node may get a "PROCLAIM" message from node "A" and join in an AMG with it, while node "A" may itself join in a group with node "B" as the GL. A mechanism is introduced herein where a node getting a "PROCLAIM" message does not immediately respond with a "JOIN" message, but—during an interval—awaits for a "PROCLAIM" message from a node with an even higher IP address. At the end of the period, the node responds to the node with the highest IP address.

The "auction period" is short-circuited when the sender of the "PROCLAIM" message has a ranking fraction (the R variable defined above) smaller than a given value.

Such a mechanism is implemented by, whenever a "PROCLAIM" message is received:

```
If sender's R value is smaller than a threshold then:
        Reply to "PROCLAIM" message with a "JOIN" message;
        Cancel "auction timer";
        If previous "PROCLAIM" message already stored then
        Discard previous "PROCLAIM" message;
```

-continued

```
Else
        If "auction timer" not set, set "auction timer."
        If previous "PROCLAIM" message already stored,
            If sender of the message has a higher ranking
                then
                    Discard previously received "PROCLAIM"
                        message;
                    Store copy of the message, including the
                        ranking value of the sender;
            Else discard new message;
        Else store copy of the message, including the ranking value
            of the sender.
When the "auction" timer expires
        Retrieve stored "PROCLAIM" message;
        Reply to "PROCLAIM" message with a "JOIN" message;
        Discard stored "PROCLAIM" message.
```

What is claimed is:

1. A method for reducing formation messages in establishing clusters in a distributed data processing environment having a plurality of nodes, said method comprising:
    ranking nodes within the environment according to at least one criterion;
    sending messages requesting cluster formation from a first node to a plurality of other nodes in the environment, with a frequency of said messages being sent by the first node being chosen based on a node ranking for the first node, wherein higher ranking nodes transmit said messages more frequently than lower ranking nodes, and wherein the first node is a higher ranking node relative to the plurality of other nodes; and
    providing lower ranked nodes in the environment with an opportunity to join a cluster without having to themselves act as a requestor for joining a cluster.

2. The method of claim 1, further comprising the first node accepting a lower-ranked node into a cluster of the first node, wherein the accepting comprises the first node waiting a predetermined time to accept a lower-ranked node with a highest rank among the plurality of other nodes that responded.

3. The method of claim 1 in which said messages requesting cluster formation comprise at least one of PROCLAIM, JOIN, PREPARE TO COMMIT and COMMIT messages.

4. The method of claim 1, wherein said at least one criterion comprises an Internet Protocol address.

5. The method of claim 4, wherein the ranking comprises ranking nodes in descending order according to Internet Protocol address.

6. The method of claim 1, wherein the sending comprises temporarily increasing the frequency of said messages from the first node in response to receipt by the first node of one or more said messages from one or more lower ranked nodes.

7. At least one program storage device readable by a non-transitory machine, storing at least one program of instructions executable by the non-transitory machine to rank nodes within the environment according to at least one criterion; send messages requesting cluster formation from a first processing node to a plurality of other nodes in the environment, with a frequency of said messages being sent by the first node being chosen based on a node ranking for the first node, wherein higher ranking nodes transmit said messages more frequently than lower ranking nodes, and wherein the first node is a higher ranking node relative to the plurality of other nodes; and provide lower ranked nodes in the environment with an opportunity to join a cluster without having to themselves act as a requestor for joining a cluster.

8. The least one program storage device of claim 7, wherein the at least one program of instructions is further executable by the non-transitory machine to accept by the first node a lower-ranked node into a cluster of the first node, wherein the first node waits a predetermined time to accept a lower-ranked node with a highest rank among the plurality of other nodes that responded.

9. The least one program storage device of claim 7, in which said messages requesting cluster formation comprise at least one of PROCLAIM, JOIN, PREPARE TO COMMIT and COMMIT messages.

10. The least one program storage device of claim 7, wherein said at least one criterion comprises an Internet Protocol address.

11. The least one program storage device of claim 7, wherein the ranking comprises ranking nodes in descending order according to Internet Protocol address.

12. The least one program storage device of claim 7, wherein the sending comprises temporarily increasing the frequency of said messages from the first node in response to receipt by the first node of one or more said messages from one or more lower ranked nodes.

13. An interconnected network of data processing nodes having stored therein instructions executable by said nodes to rank nodes within the environment according to at least one criterion; send messages requesting cluster formation from a first processing node to a plurality of other nodes in the environment, with a frequency of said messages being sent by the first node being chosen based on a node ranking for the first node, wherein higher ranking nodes transmit said messages more frequently than lower ranking nodes, and wherein the first node is a higher ranking node relative to the plurality of other nodes; and provide lower ranked nodes in the environment with an opportunity to join a cluster without having to themselves act as a requestor for joining a cluster.

14. The interconnected network of data processing nodes of claim 13, further comprising the first node accepting a lower-ranked node into a cluster of the first node, wherein the accepting comprises the first node waiting a predetermined time to accept a lower-ranked node with a highest rank among the plurality of other nodes that responded.

15. The interconnected network of data processing nodes of claim 13, in which said messages requesting cluster formation comprise at least one of PROCLAIM, JOIN, PREPARE TO COMMIT and COMMIT messages.

16. The interconnected network of data processing nodes of claim 13, wherein said at least one criterion comprises an Internet Protocol address.

17. The interconnected network of data processing nodes of claim 13, wherein the ranking comprises ranking nodes in descending order according to Internet Protocol address.

18. The interconnected network of data processing nodes of claim 13, wherein the sending comprises temporarily increasing the frequency of said messages from the first node in response to receipt by the first node of one or more said messages from one or more lower ranked nodes.

* * * * *